US011422769B2

(12) United States Patent
Coffman et al.

(10) Patent No.: US 11,422,769 B2
(45) Date of Patent: *Aug. 23, 2022

(54) INTERACTION OF SOUND, SILENT AND MUTE MODES IN AN ELECTRONIC DEVICE

(71) Applicant: Apple Inc., Cupertino, CA (US)

(72) Inventors: Patrick Coffman, San Francisco, CA (US); Meriko Borogove, San Francisco, CA (US); Jonathan Bennett, San Francisco, CA (US); Gregory Chapman, San Jose, CA (US); Anthony Guetta, San Carlos, CA (US); Deepak Iyer, Sunnyvale, CA (US); Eric Johnson, Morgan Hill, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,742

(22) Filed: Jun. 25, 2020

(65) Prior Publication Data
US 2020/0326908 A1    Oct. 15, 2020

Related U.S. Application Data

(63) Continuation of application No. 16/545,195, filed on Aug. 19, 2019, now Pat. No. 10,725,731, which is a
(Continued)

(51) Int. Cl.
*H04R 29/00* (2006.01)
*G06F 3/16* (2006.01)
*G06F 16/683* (2019.01)

(52) U.S. Cl.
CPC ............ *G06F 3/165* (2013.01); *G06F 16/683* (2019.01); *H04R 29/00* (2013.01)

(58) Field of Classification Search
CPC ........ G06F 3/165; G06F 16/60; G06F 16/683; G06F 15/02; G06F 9/542; H04M 1/72522;
(Continued)

(56) References Cited

U.S. PATENT DOCUMENTS 9,183,003 B2 * 11/2015 Bilinski .................. G06F 9/451
10,387,109 B2 * 8/2019 Coffman ................ G06F 3/165
(Continued)

*Primary Examiner* — Xu Mei
(74) *Attorney, Agent, or Firm* — Womble Bond Dickinson (US) LLP

(57) ABSTRACT

This is directed to controlling the output of audio based on the mode of an electronic device. In particular, this is directed to an electronic device having a sound mode, silent mode, and mute mode controlling the output of audio along different audio output routes. In the sound mode, all audio can be output, while only registered or authorized audio can be output in the silent mode. In the mute mode, no audio can be output. The sound and silent modes can be enabled using an interface of the device (e.g., a switch having two possible states), while the mute mode can be enabled using an accessory coupled to the device. To disengage the mute mode, a user can provide a corresponding instruction using the accessory, or providing an instruction on the device related to volume control. For example, a user can change the device volume using an on-device interface, or toggle a sound/silent switch to a sound mode.

17 Claims, 6 Drawing Sheets

Related U.S. Application Data continuation of application No. 15/729,425, filed on Oct. 10, 2017, now Pat. No. 10,387,109, which is a continuation of application No. 14/594,775, filed on Jan. 12, 2015, now Pat. No. 9,792,083, which is a continuation of application No. 12/895,464, filed on Sep. 30, 2010, now Pat. No. 8,934,645.

(60) Provisional application No. 61/298,456, filed on Jan. 26, 2010.

(58) Field of Classification Search
CPC ...... H04R 2499/15; H04R 5/04; H04R 29/00; H04R 2420/03; H04R 2225/61
USPC ....... 381/56, 104, 105, 107, 109, 58, 77, 79, 381/123; 700/94; 709/318
See application file for complete search history.

(56) References Cited

U.S. PATENT DOCUMENTS

| | | | |
|---|---|---|---|
| 2005/0261789 A1* | 11/2005 | Chen ................. | H04W 4/18 700/94 |
| 2010/0104264 A1* | 4/2010 | Rumreich .......... | H04N 21/44016 386/230 |
| 2011/0310308 A1* | 12/2011 | Asayama ............ | H04R 3/12 348/738 |
| 2012/0039489 A1* | 2/2012 | Chen ................. | H03G 3/32 381/107 |

\* cited by examiner

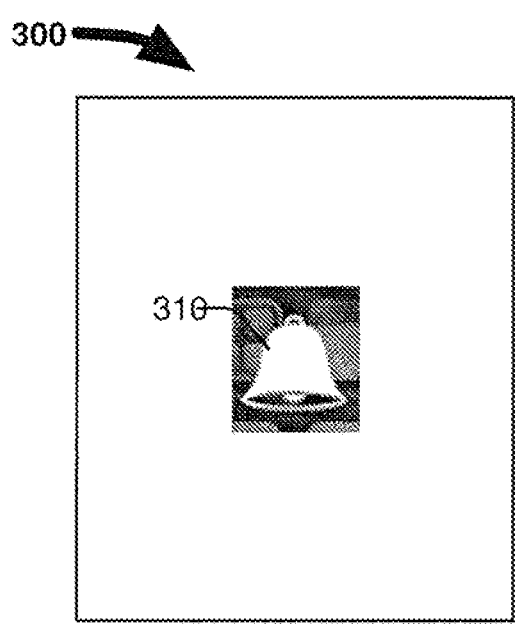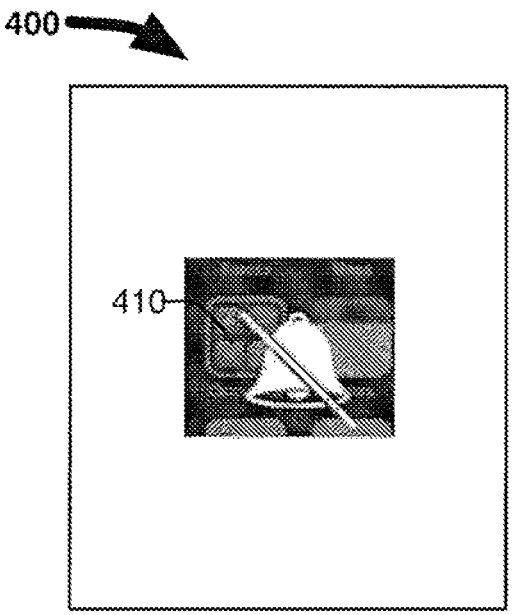
FIG. 3                FIG. 4
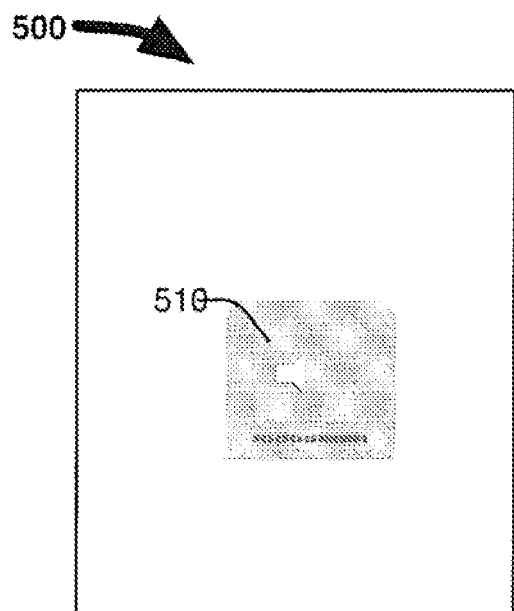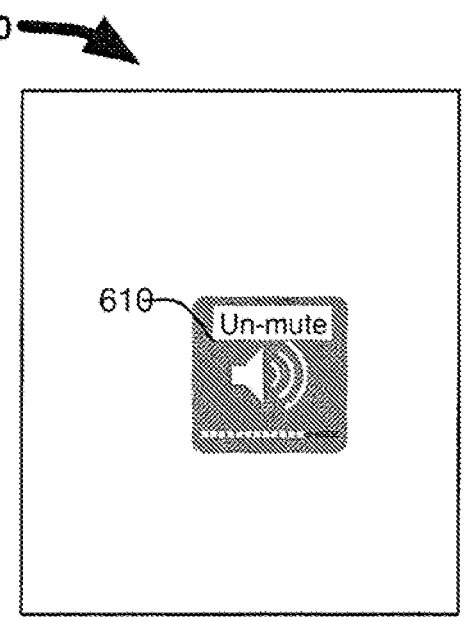
FIG. 5                FIG. 6

INTERACTION OF SOUND, SILENT AND MUTE MODES IN AN ELECTRONIC DEVICE

This application is a continuation of U.S. application Ser. No. 16/544,195 filed Aug. 19, 2019, which is a continuation of U.S. application Ser. No. 15/729,425 filed Oct. 10, 2017, now U.S. Pat. No. 10,387,109, which is a continuation of U.S. application Ser. No. 14/594,775, filed Jan. 12, 2015, now U.S. Pat. No. 9,792,083, which is a continuation of U.S. application Ser. No. 12/895,464 filed Sep. 30, 2010, now U.S. Pat. No. 8,934,645, which claims the benefit of U.S. Provisional Application No. 61/298,456, filed Jan. 26, 2010.

BACKGROUND

An electronic device can include several modes for providing audio to a user. For example, a telephone (e.g., a cellular telephone) can include a ring mode and a silent mode. When the ring mode is enabled, incoming communications requests may cause the device to output audio indicating the request to a user. In addition, system sounds (e.g., audio associated with inputs, such as key striking sounds) or application sounds (e.g., background music in a game application, or voice over help) can be provided. Similarly, sounds explicitly requested by a user, such as media playback audio (e.g., provided by a media streaming application or by a media application for playing back locally stored media) can be provided when the ring mode is enabled.

A user can switch from the ring mode to a silent mode to prevent the device from outputting some of the audio. For example, a user may not want the cellular telephone to provide an audible ring while in a meeting, but may instead want the cellular telephone to vibrate. In silent mode, no audio indicating an incoming communications request can be provided, but other non-audible processes can be used instead to indicate the communications request (e.g., a display indication, or a haptic indication). Similarly, some system sounds and application sounds provided in the ring mode can also be silenced in a silent mode. Some system sounds and application sounds, as well as sounds explicitly requested by the user, can however be provided. The system and application can qualify different sounds that they provide using different categories including, for example, categories that indicate whether a sound is silenced by the silent mode.

Other electronic devices, however, may have no need for a ring mode. In particular, notebook and desktop computers, which may not ring upon receiving a communications request, may not include ring and silent modes. Instead, these devices can include mute and un-mute modes. In an un-mute mode, all sounds generated by the device can be provided to a user. In particular, system sounds and application sounds can be provided using different routes (e.g., on-device speakers, through a line-out port, or through an audio jack). In a mute mode, no sounds generated by the device can be provided to the different routes for output. For example, the device may not send audio associated with the system or application to subroutines or processes associated with providing audio outputs.

SUMMARY

This is directed to a device having both sound and silent modes as well as mute and un-mute modes, and to the interaction of the modes. In some embodiments, the un-mute mode can be the same as the one of the sound and silent modes that is enabled. The silent mode can be enabled using an interface of the device, while the mute mode can be enabled using an accessory coupled to the electronic device.

An electronic device can include several modes for controlling the output of audio. In some embodiments, the electronic device can toggle between a sound mode and a silent mode. The electronic device can include any suitable interface for toggling between the modes including, for example, a button. When the sound mode is enabled, all audio generated or requested by applications or processes of the device can be output by audio output routes of the device. For example, audio can be output using one or more of speakers on the device, components coupled to the device via connectors (e.g., headphones connected through an audio jack, or speakers connected via USB), or components wirelessly coupled to the device.

In the silent mode, some of the audio generated or requested by applicants or processes can be restricted and prevented from being output using one or more audio output routes. For example, ringtones and ambient sounds can be restricted, while sounds requested by a user (e.g., audio associated with user-requested media playback) can be provided. While in silent mode, the user can control the volume of output audio by providing instructions to increase or decrease the output volume (e.g., the volume of audio registered to be output in the silent mode).

In some embodiments, the electronic device can in addition include a mute mode engageable by an accessory coupled to the electronic device. For example, a keyboard accessory can be coupled to the device using a connector or a wireless protocol. The keyboard accessory can include several volume control keys including, for example, a mute key. In response to a user selecting the mute key, the electronic device can stop the output of all audio along all audio output routes. The user can un-mute the device using the accessory, or by instructing the device to change volume (e.g., with or without using the accessory).

In some embodiments, the sound/silent modes and the mute mode can operate independently and in an additive manner. Alternatively, switching from silent mode to sound mode (e.g., using the electronic device switch) can disable the mute mode and enable the device to resume outputting audio. In some embodiments, some audio can be output despite the mute mode. Such audio can be associated with particular applications or processes including, for example, applications that are of high interest to the user even when the user has provided an instruction to enable the mute mode (e.g., a process to "find my device," or an alarm clock).

BRIEF DESCRIPTION OF THE DRAWINGS

The above and other features of the present invention, its nature and various advantages will be more apparent upon consideration of the following detailed description, taken in conjunction with the accompanying drawings in which:

FIG. 3 is a schematic view of an illustrative display indicating that a sound mode is enabled in accordance with one embodiment of the invention;

FIG. 4 is a schematic view of an illustrative display indicating that a silent mode is enabled in accordance with one embodiment of the invention;

FIG. 5 is a schematic view of an illustrative display indicating that a mute mode is enabled in accordance with one embodiment of the invention;

FIG. 6 is a schematic view of an illustrative display indicating that a mute mode is disabled in accordance with one embodiment of the invention;

DETAILED DESCRIPTION

An electronic device having a sound mode, a silent mode and a mute mode for controlling the output of audio by the device is provided. The device can include an input interface for toggling between the sound and silent modes, and be coupled to an accessory for enabling or disabling the mute mode.

Figure 1:
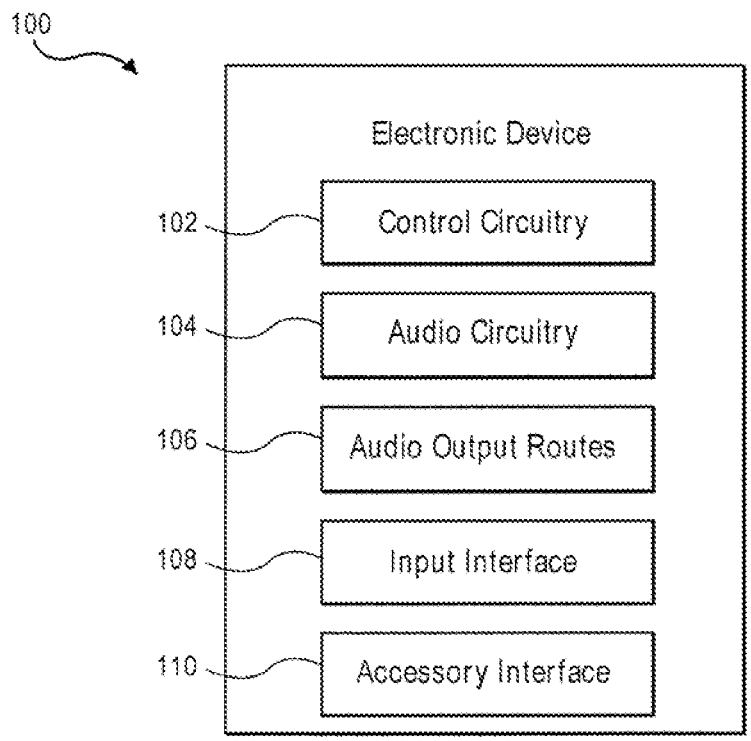
FIG. 1 is a block diagram of an illustrative electronic device that can provide audio to a user in accordance with one embodiment of the invention.

FIG. 1 is a block diagram of an illustrative electronic device that can provide audio to a user in accordance with one embodiment of the invention. Electronic device 100 can include control circuitry 102 that includes one or more processors for controlling the operations and performance of electronic device 100. For example, control circuitry 102 may be used to run an operating system, firmware, media playback applications, media editing applications, or any other application. In some embodiments, the control circuitry can drive a display and process inputs received from a device interface.

Device 100 can provide any suitable output for a user of the device. In some embodiments, electronic device 100 can include audio circuitry 104. The audio circuitry can be coupled to or include input/output circuitry for converting (and encoding/decoding, if necessary) digital data (e.g., reflecting audio clips) and other data into analog signals. In some embodiments, audio circuitry 104 can send digital data (converted or decoded if necessary) to one or more audio output routes, where an audio output component associated with the route can convert the received data to an analog signal. The audio circuitry can receive or retrieve audio to be played back from software applications or firmware operating on the device. For example, an application can provide information identifying a particular audio clip to play back to audio circuitry 104 for output.

Audio circuitry 104 can provide audio signals to any suitable audio output route 106 for output by the device. Audio output route 106 can include any suitable wired or wireless route connecting audio circuitry 104 to an audio output component that includes digital to analog conversion circuitry (e.g., a speaker, earbud, or earpiece). In some embodiments, audio output route 106 can include, for example, embedded speakers, a headphone jack, a 30-pin connector that includes line out and USB audio routes, a Bluetooth audio route, routes supporting the A2DP or HFP protocols, or combinations of these.

A user can interact with the device using any suitable interface. In some embodiments, electronic device 100 can include input interface 108, which can provide inputs to input/output circuitry of electronic device 100. Input interface 108 can include any suitable input interface such as, for example, a button, keypad, dial, a click wheel, or a touch screen. In some embodiments, electronic device 100 may include a capacitive sensing mechanism, or a multi-touch capacitive sensing mechanism. In some embodiments, input interface 108 can include a button or switch. The button or switch can be associated with a particular device operation. For example, electronic device 100 can include a button associated with toggling a ring and silent mode. As another example, electronic device 100 can include two buttons for controlling the volume of audio output along audio output routes 106.

In some embodiments, one or more accessories or accessory components or devices can be connected to electronic device 100. The accessory can be coupled to the electronic device using any suitable approach including, for example, using accessory interface 110. Accessory interface 110 can include any suitable interface for establishing a communications path between an accessory and the electronic device. For example, accessory interface 110 can include a wireless interface over which data can be transferred (e.g., a WiFi or Bluetooth interface). As another example, accessory interface 110 can include a wired interface, such as a connector to which the accessory can be coupled (e.g., directly or via a cable). Any suitable connector can be used including, for example, USB, Firewire, 30-pin, or combinations of these. Any suitable accessory can be coupled to electronic device 100 including, for example, input interfaces (e.g., a keyboard or a mouse), output interfaces (e.g., speakers or a projector), or combinations of these.

Figure 2:
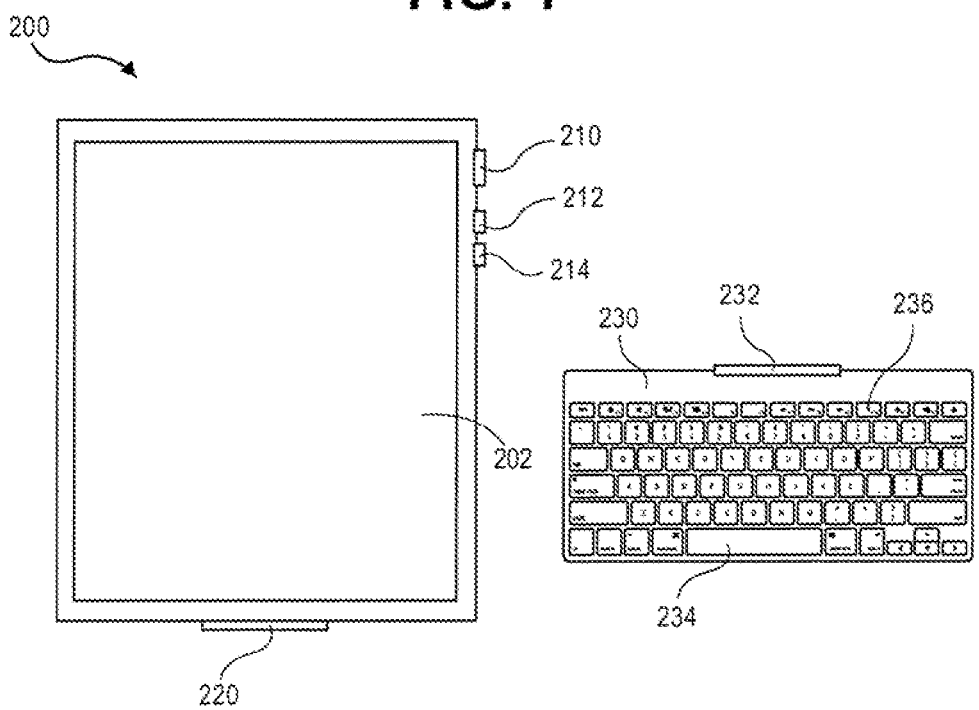
FIG. 2 is a schematic view of an illustrative electronic device coupled with an accessory in accordance with one embodiment of the invention.

FIG. 2 is a schematic view of an illustrative electronic device coupled with an accessory in accordance with one embodiment of the invention. Electronic device 200 can include some or all of the components and features of electronic device 100 (FIG. 1). Electronic device 200 can include display interface 202 on which information can be displayed, and buttons 210, 212 and 214 with which a user can provide inputs to the device. In one implementation, button 210 can include a switch that can be toggled between two states (e.g., a sound/silent switch), while buttons 212 and 214 can include a single element positioned over adjacent switches within the device such that only one of buttons 212 and 214 can be pressed at a given time (e.g., a bar rotating around an axis placed between the two switches). Buttons 210, 212 and 214 can be associated with specific device operations. For example, button 210 can be associated with toggling between sound and silent modes, while buttons 212 and 214 can be associated with increasing or decreasing the volume of audio output by the device along one or more of the audio output routes.

In the example of FIG. 2, electronic device 200 can be coupled to keyboard accessory 230. The electronic device can use any accessory interface to connect to accessory 230 including, for example, a wireless interface (e.g., a Bluetooth interface) or a physical connector. For example, electronic device 200 can couple connector 220 to corresponding connector 232 of accessory 230 to enable a communications path between the devices. Connectors 220 and 232 can include, for example, 30-pin connectors, USB connectors, or combinations of these. In some embodiments, accessory 230 can be part of a dock, or include a receiving portion for supporting and retaining electronic device 200. Keyboard accessory 230 can include any suitable interface including, for example, buttons 234. In particular, keyboard accessory 230 can include mute button 236.

The electronic device can provide any suitable audio output to a user of the device. In some embodiments, the particular audio available for output, as well as the particular routes available for providing the audio, can be determined based on the audio output mode of the device. In some embodiments, the electronic device can include a sound mode. A user can enable the sound mode using any suitable approach including, for example, by toggling a switch (e.g., button 210, FIG. 2) to a sound option. In response to enabling the sound mode, the electronic device can display an overlay to identify the current mode to the user. FIG. 3 is a schematic view of an illustrative display indicating that a sound mode is enabled in accordance with one embodiment of the invention. Display 300 can include interface element 310 associated with the sound mode. In response to receiving an input enabling the sound mode, the electronic device can overlay element 310 on the display for a predetermined period of time (e.g., 3 seconds). In some embodiments, interface element 310 can be partially transparent so that elements displayed underneath interface element 310 remain visible. Element 310 can fade after a particular duration has lapsed.

When the sound mode is enabled, the electronic device can output any suitable audio. In some embodiments, the electronic device can provide any or all audio generated by the device system or by applications to one or more audio output routes. In some embodiments, the generated audio (or the process generating or providing the audio) can identify one or more audio output routes to use. Alternatively, the electronic device can select a particular audio output route to use based on the status of the device. For example, if a headphone is plugged into an audio jack, or if a line-out audio component is coupled to the device, the headphone or audio component can preempt an audio output route associated with speakers of the device.

The device can output audio at any suitable volume. In some embodiments, the audio can be output at a user-defined volume, for example set by a volume slider displayed on screen, or by inputs detected on a volume button of the device (e.g., buttons 212 or 214, FIG. 2) Some audio output can instead or in addition be provided at a fixed volume level. In particular, some audio can be provided on audio output routes that do not support volume control. Instead, the volume control is provided using the component or accessory at the end of the audio output route that outputs the audio (e.g., a speaker) Such audio routes can include, for example, line-out audio routes (e.g., within a 30-pin connector route), audio provided using the Bluetooth A2DP protocol, or other such routes. The audio output by the device can then be provided at a fixed line level volume (e.g., 60% of full volume).

In some cases, a user may wish to limit the audio output by the device. To do so, a user can enable a silent mode. For example, a user can toggle a switch (e.g. button 210, FIG. 2) to disable the sound mode and instead enable the silent mode. In response to enabling the silent mode, the electronic device can display an overlay to identify the current mode to the user. FIG. 4 is a schematic view of an illustrative display indicating that a silent mode is enabled in accordance with one embodiment of the invention. Display 400 can include interface element 410 associated with the silent mode. Interface element 410 can have any suitable appearance including, for example, a variation of the sound interface element (e.g., interface element 310 with a line through it). In response to receiving an input enabling the silent mode, the electronic device can overlay element 410 on the display for a predetermined period of time (e.g., 3 seconds). In some embodiments, interface element 410 can be partially transparent so that elements displayed underneath interface element 410 remain visible. Element 410 can fade after a particular duration has lapsed.

In the silent mode, only some of the audio available for output by the device may be provided to one or more audio output routes (e.g., only registered audio). In particular, the audio provided by each application or process of the device can be categorized in one or more categories, or tagged with one or more attributes. In one implementation, the audio provided by each application or process can be categorized as either output in silent mode, or not output in silent mode. For example, audio can be associated with one of several categories (e.g., audio playback or ambient audio), where each of those several categories are in turn associated either with outputting the audio in silent mode, or not outputting the audio in silent mode. As another example, audio can instead or in addition be categorized or tagged directly as audio to output or not in the silent mode (e.g., registered or not for output in the silent mode).

An application developer or other author of the process providing audio for output can decide whether or not the audio should be output in the silent mode. In some embodiments, an application developer can make the determination based on the importance of the audio clip to the application, and the relevance of the audio clip with respect to the functionality and purpose of the application. For example, audio providing background music to a game can be categorized as audio that should not be output in a silent mode, while an audio clip providing a hint or advice as part of the game can be categorized as audio that should be output in the silent mode. As another example, a media playback application (e.g., an application for streaming media, or an application for playing back locally stored media) can categorize all of the audio provided as part of the application as audio that should be output in the silent mode, as the entire purpose of the application is to provide an audio output.

When audio circuitry of the device receives or identifies audio to output, the audio circuitry can first determine the category associated with the audio. If the audio is associated with a category that does not permit the output of audio in silent mode (e.g., unregistered audio), the audio circuitry can disregard the audio. Alternatively, the audio circuitry can provide the audio or information identifying the audio to another electronic device component (e.g., control circuitry) with an indication that the audio is not to be output while in silent mode.

In some embodiments, the audio circuitry can instead or in addition determine whether an audio output route that remains available or active while in silent mode is available. For example, the audio circuitry can determine whether an audio output route associated with a headphone jack (e.g., plugged in headphones) or a line-out (e.g., external speakers) is available. If an enabled audio output route remains available, the audio circuitry can direct the audio to the available audio output route for output to the user (e.g., provide a ring tone when a communications request is received while a user is listening to a media item output through headphones). If only disabled or unauthorized audio output routes are available, however (e.g., only the embedded speakers of the device are available), the audio circuitry may prevent the audio from being provided to the audio output routes. In one implementation, audio output routes associated with audio that does not have volume control (e.g., line out and A2DP audio output routes) may remain enabled while in silent mode (e.g., audio output along these routes remains at the line level volume).

In addition to the sound and silent modes, the electronic device can include a mute mode. Contrary to the sound and silent modes, however, the mute mode may not be associated with a particular interface or input of the device. Instead, an accessory coupled to the device can be used to enable the mute mode. For example, a keyboard accessory coupled to the electronic device can include a key or other input interface (e.g., mute key 236, FIG. 2) operative to enable the mute mode. In some embodiments, however, the electronic device can include an interface for enabling the mute mode (e.g., a separate button, or an intermediate state for the sound/silent switch).

In response to enabling the mute mode, the electronic device can display an overlay to identify the current mode to the user. FIG. 5 is a schematic view of an illustrative display indicating that a mute mode is enabled in accordance with one embodiment of the invention. Display 500 can include interface element 510 associated with the mute mode. In response to receiving an input enabling the mute mode, the electronic device can overlay element 510 on the display for a predetermined period of time (e.g., 3 seconds). In some embodiments, interface element 510 can be partially transparent so that elements displayed underneath interface element 510 remain visible. Element 510 can fade after a particular duration has lapsed.

When the mute mode is enabled, the electronic device can prevent all audio from being output along all audio output routes. For example, the electronic device can prevent audio from being output from current audio output routes (e.g., embedded speakers of the device), available audio output routes (e.g., through an audio jack to headphones that could be plugged into the jack), or future audio output routes (e.g., a new accessory connected via Bluetooth). In particular, the mute mode can prevent audio from being output along audio output routes that do not include volume control (e.g., line out and A2DP) by setting the output volume to 0 (and not a line level volume), unlike the silent mode.

When the electronic device is disconnected from the accessory (e.g., the wireless accessory moves out of range of the device, or the wired accessory is disconnected from a connector of the device), the electronic device can maintain the mute mode of the device. In particular, because the mute mode can be enabled using the accessory, it may be desirable to retain the mute mode when the device is disconnected from the accessory so that a user can make use of the mute mode without the accessory. In some cases, however, disconnecting the accessory from the device can instead disable the mute mode and return the device to the silent or sound mode (e.g., based on the state of the sound/silent switch).

A user can disengage the mute mode using any suitable approach. In some embodiments, the user can disengage the mute mode by providing a corresponding input on the accessory (e.g., pressing the mute key). As another example, the user can adjust the volume of the device. For example, the user can provide an input to increase or decrease the volume using the accessory (e.g., press a volume up or volume down key). As still another example, the user can provide an input to adjust the volume using the device (e.g., press a volume up or volume down button of the device, or slide a volume slider displayed on a display interface). In response to receiving an instruction to adjust the volume, the electronic device can disengage the mute mode and return the output volume to its previous level prior to engaging the mute mode. Alternatively, the electronic device can disengage the mute mode and adjust the previous volume level in a manner corresponding to the received volume adjustment input (e.g., raise or lower the previous volume based on the input received).

In response to disengaging the mute mode, the electronic device can display a corresponding indication to the user. For example, the electronic device can display one of the interface elements corresponding to the current mode of the device (e.g., sound or silent). As another example, the electronic device can display a variation of the interface element displayed when the mute mode was engaged. FIG. 6 is a schematic view of an illustrative display indicating that a mute mode is disabled in accordance with one embodiment of the invention. Display 600 can include interface element 610 associated with the un-mute mode. Interface element 610 can have any suitable appearance including, for example, a variation of the mute interface element (e.g., interface element 510 with waves indicating that sound is emitted). In response to receiving an input disabling the mute mode, the electronic device can overlay element 610 on the display for a predetermined period of time (e.g., 3 seconds). In some embodiments, interface element 610 can be partially transparent so that elements displayed underneath interface element 610 remain visible. Element 610 can fade after a particular duration has lapsed.

In some embodiments, the mute mode and the sound/silent modes can be independent and additive. In other words, the mute mode can prevent all audio from being output by the device along all audio output routes, and changing between the silent and sound modes can have no effect on the mute mode (e.g., no sound will be output despite switching between the sound and silent modes, because the mute mode remains enabled). In addition, disabling or disengaging the mute mode may not automatically re-enable all audio. Instead, the audio output of the device can then be controlled by the mode set by the sound/silent interface (e.g., the sound/silent switch of the device).

In some embodiments, the mute mode can operate with a few variations to the description above. In one implementation, one or more particular audio outputs can be provided along particular audio output routes despite the mute mode. The particular audio outputs can be limited to system audio (e.g., audio associated with operating system operations, or audio associated with applications provided by the operating system or device manufacturer), such that audio from an application operating on the device cannot preempt the mute mode. For example, audio associated with a feature for "finding my device" (e.g., causing the device to ring remotely so that it can be found when it is lost or misplaced) can be output. As another example, clock alarms can be output in the mute mode, as well as ongoing communications operations audio (e.g., enable telephone audio in the mute mode). As still another example, ringtones associated with incoming communications request, and audio from newly initiated communications operations can be provided in the mute mode.

The audio authorized to be output in the mute mode can be provided using any suitable audio output route. For example, the audio can be provided only using routes that do not have volume control. As another example, the audio can be provided using routes other than the embedded speakers of the device (e.g., requiring another component for outputting the audio, such as headphones). As still another example, any audio output route can be enabled for the authorized audio. In some cases, the authorized routes can vary based on the particular audio (e.g., authorize "find my device" and alarm clock audio along the device speaker audio output route, but do not authorize ongoing communications audio).

In some embodiments, other inputs can be used to disengage the mute mode. In one particular implementation, switching the device to the sound mode can also disengage the mute mode. For example, a user may expect a mute mode to be disengaged when a sound mode, which can be inconsistent with the mute mode, is enabled on the device. The user can enable the sound mode while the device is in the mute mode using any suitable approach including, for example, by changing a sound/silent switch of the device from a silent setting to a sound setting. In some embodiments, however, changing the switch from a sound setting to a silent setting can have no effect on the mute mode. In this implementation, the mute mode and the sound/silent modes are not independent and additive, but interact when the mute mode is initially enabled, and an instruction to enable the sound mode is received.

Figure 7:
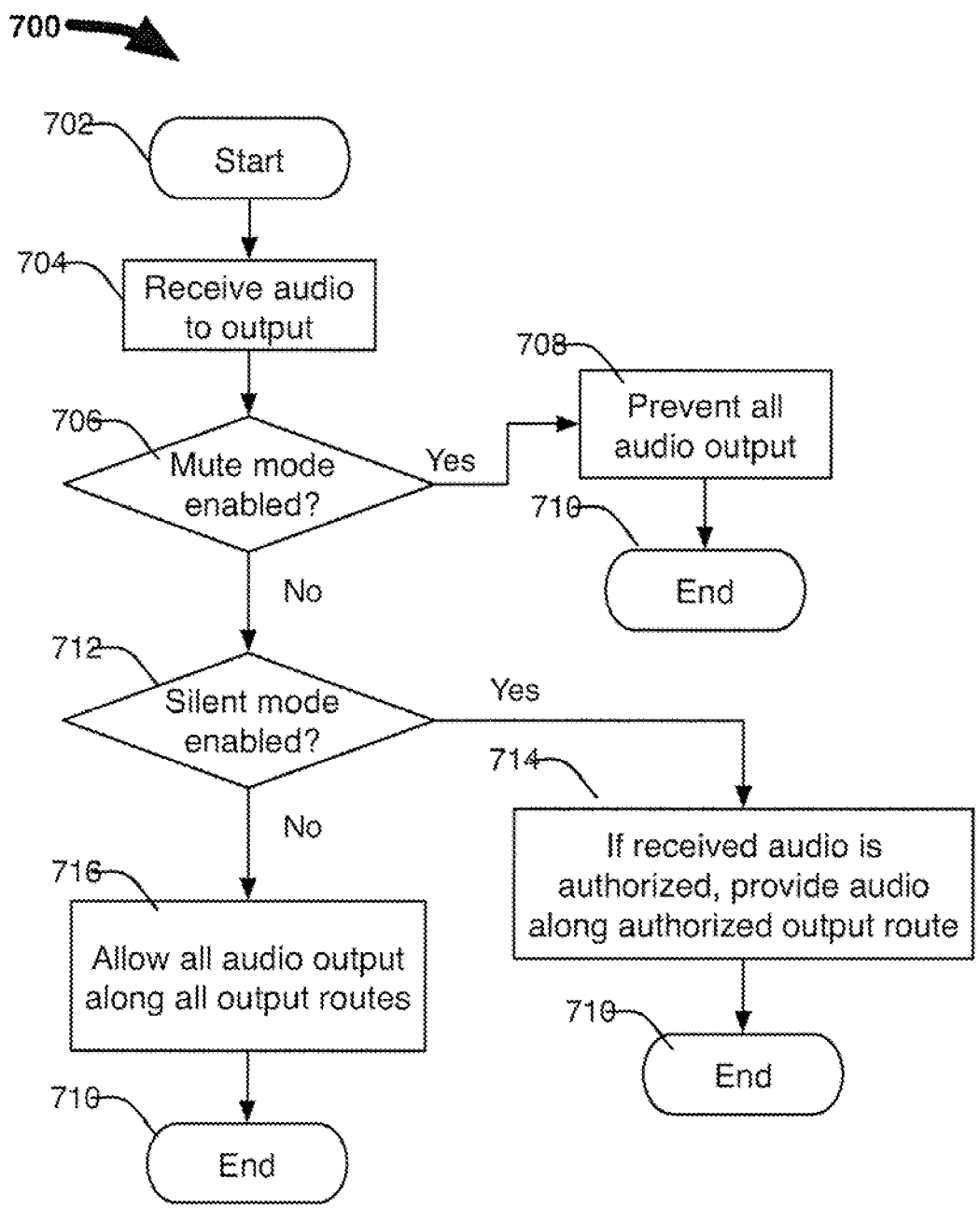
FIG. 7 is a flow chart of an illustrative process for providing audio output based on the mode of the device in accordance with one embodiment of the invention.

FIG. 7 is a flow chart of an illustrative process for providing audio output based on the mode of the device in accordance with one embodiment of the invention. Process 700 can begin at step 702. At step 704, the electronic device can receive audio to output. For example, audio circuitry of the device can receive a particular audio clip (e.g., a reference to an audio clip) from an application or process, and a request to output the audio clip. The audio clip can be accompanied by a request to output the audio on a particular audio output route. In some cases, the audio clip can be associated with one or more categories describing whether output of the received audio is authorized in different modes of the device. At step 706, the electronic device can determine whether a mute mode is enabled. For example, the electronic device can determine whether an instruction was received from an accessory coupled to the device to mute audio output by the device. The accessory can be coupled to the device using any suitable approach including, for example, a wired or wireless accessory interface.

If the electronic device determines that the mute mode is enabled, process 700 can move to step 708 and prevent all audio output along all audio output channels. For example, audio circuitry of the device may not send any signals along an audio output route. In some embodiments, some specific audio outputs may be authorized along specific audio output routes. For example, some system audio (e.g., associated with "find my device" functionality) can always be output. If the received audio is identified as being authorized for output even in the mute mode, the electronic device can output the audio along one or more audio output routes (e.g., along all available audio output routes). Process 700 can then end at step 710.

If, at step 706, the electronic device instead determines that the mute mode is not enabled, process 700 can move to step 712. At step 712, the electronic device can determine whether a silent mode is enabled. For example, the electronic device can determine whether a switch of the device having two available states is in the state associated with the silent mode. If the electronic device determines that the silent mode is enabled, process 700 can move to step 714. At step 714, the electronic device can determine whether the received audio is authorized or registered to be output along a particular audio output route when the silent mode is enabled, and output the audio only if it is authorized, or if the audio is registered for the mode. For example, the electronic device can determine one or more attributes of the audio (e.g., a category or tag associated with the audio), and determine the output privileges of the audio based on the attributes. The electronic device can output the audio, if authorized, along any suitable audio output route. For example, the audio may be associated with a particular audio output route. Alternatively, the audio may only be authorized for output along a particular route. In some embodiments, the audio can be output along several audio output routes simultaneously. Process 700 can then move to step 710 and end.

If, at step 712, the electronic device instead determines that the silent mode is not enabled, process 700 can move to step 716. At step 716, the electronic device can determine that the sound mode is enabled, and allow all audio output along all audio output routes. For example, control circuitry of the electronic device can direct the audio circuitry to provide the received audio output to one or more audio output routes. Process 700 can then end at step 710.

Figure 8:
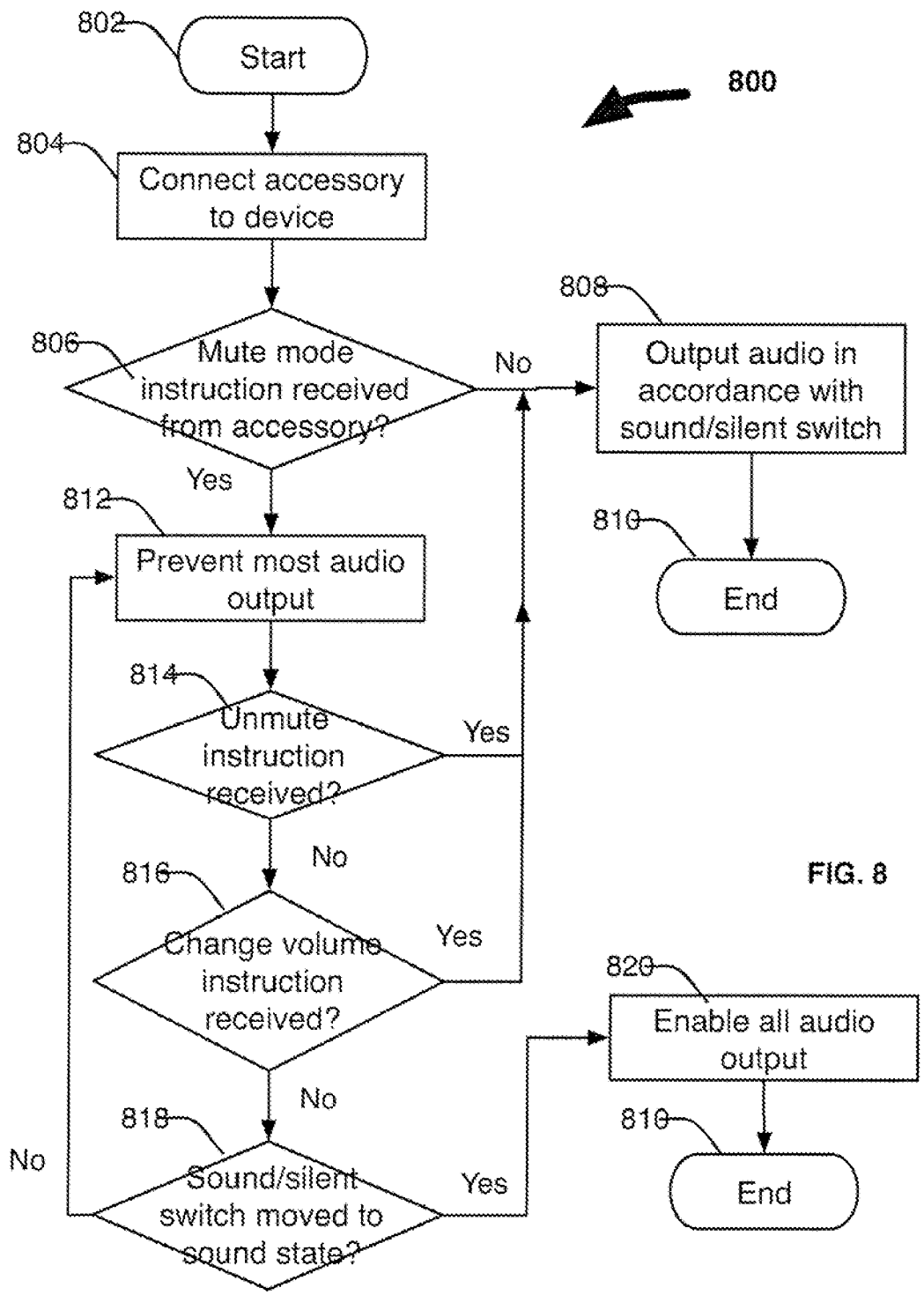
FIG. 8 is a flowchart of an illustrative process for enabling and disabling the mute mode in accordance with one embodiment of the invention.

FIG. 8 is a flowchart of an illustrative process for enabling and disabling the mute mode in accordance with one embodiment of the invention. Process 800 can begin at step 802. At step 804, an accessory can be connected to the electronic device. For example, a keyboard accessory can be coupled to the device via an accessory interface (e.g., wired or wireless). At step 806, the electronic device can determine whether a mute mode instruction was received from the accessory. In some embodiments, the instruction to enable a mute mode can be provided via the accessory (i.e., not from an input interface of the device). If the electronic device determines that no instruction to enable the mute mode was received from the accessory, process 800 can move to step 808.

At step 808, the electronic device can output audio in accordance with the state of a sound/silent switch. For example, audio circuitry of the device can determine whether the device is in a silent mode or in a sound mode, and output received audio from device applications or processes in accordance with the determined mode. The electronic device can determine the current mode using any suitable approach including, for example, by determining the physical state of a switch of the device (e.g., a physical switch that a user can actuate and move between two states). Process 800 can then end at step 810. If, at step 806, the electronic device instead determines that an instruction to enable the mute mode was received, process 800 can move to step 812.

At step 812, the electronic device can prevent most audio from being output. For example, audio circuitry of the device can prevent all audio from being output except for specific audio clips associated with process of high importance. In one implementation, the electronic device can prevent the output of all audio except for audio associated with one or more of a "find my device" process, alarm clock, communications audio (e.g., voice call audio), ringtones, and vibration. At step 814, the electronic device can determine whether an un-mute instruction was received from the accessory. For example, the electronic device can determine whether a user provided an input on the accessory to un-mute the device (e.g., pressed a "mute" key a second time). If the electronic device determines that an un-mute instruction was received, process 800 can move to step 808, described above.

If, at step 814, the electronic device instead determines that no un-mute instruction was received from the accessory, process 800 can move to step 816. At step 816, the electronic device can determine whether an instruction to change the output volume was received. For example, the electronic device can determine whether an input corresponding to a volume change was provided to an interface of the accessory (e.g., pressing a volume up or volume down key). As another example, the electronic device can determine whether an input was provided to an interface element of the device associated with volume control. Such interface elements can include, for example, one or more buttons on the device housing (e.g., volume up and down buttons), or a displayed volume control interface (e.g., a volume control bar and slider displayed on a screen). If an input was provided, the electronic device can determine that a user intended to disable or disengage the mute mode, and can move to step 808, described above.

If, at step 816, the electronic device instead determines that no instruction to change the output volume was received, process 800 can move to step 818. At step 818, the electronic device can determine whether a sound/silent switch of the device was moved from a state associated with the silent mode to a state associated with the sound mode. For example, the electronic device can determine whether a physical switch of the device housing was moved to reflect a user's intent to enable the sound mode. If the electronic device determines that the sound/silent switch of the device was not moved to a state associated with the sound mode, process 800 can return to step 812, described above. In some embodiments, however, changing the state of the sound/silent switch may have no effect on the mute mode, and process 800 can return to step 812 independent of the change in state of the switch. In some embodiments, the electronic device can detect a change in the state of the sound/silent switch to the silent mode. In such embodiments, the electronic device can move to step 808 and disengage the mute mode, as described above, or disregard the change in state and return to step 812, described above (e.g., changing the sound/silent switch to silent mode has no effect on the mute mode).

If, at step 818, the electronic device instead determines that the sound/silent switch of the device was moved to a state associated with the sound mode, process 800 can move to step 820. At step 820, the electronic device can determine that the sound mode is enabled, and enable all audio output along all audio output routes. For example, control circuitry of the electronic device can direct the audio circuitry to provide audio received from one or more applications or processes to one or more audio output routes for output to the user. Process 800 can then end at step 810. It will be understood that the order of some of the steps of processes 700 and 800 is illustrative and can be changed. For example, the order of steps 814, 816 and 818 can be changed, or the steps can be performed simultaneously.

In some embodiments, the audio circuitry can make use of one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

An API is an interface implemented by a program code component ("API-implementing component") that allows a different program code component ("API-calling component") to access and use one or more functions, methods, procedures, data structures, classes, and/or other services provided by the API-implementing component. An API can define one or more parameters that are passed between the API-calling component and the API-implementing component.

An API can allow a developer of an API-calling component (which may be a third party developer) to leverage specified features provided by one or more API-implementing components. An API can be a source code interface that a computer system or program library provides in order to support requests for services from an application. An API can be specified in terms of a programming language that can be interpreted or compiled when an application is built.

In some embodiments the API-implementing component may provide more than one API each providing a different view of or with different aspects that access different aspects of the functionality implemented by the API-implementing component. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may be an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component), however the API may be implemented in terms of a specific programming language.

Figure 9:
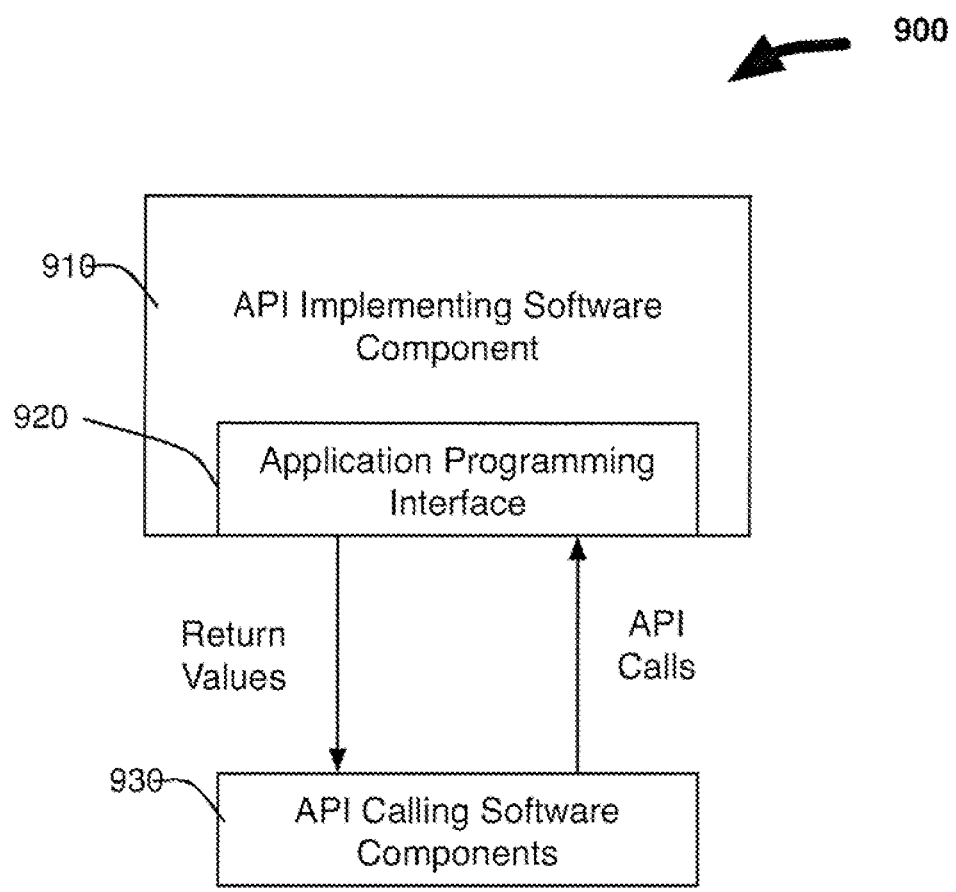
FIG. 9 is a block diagram illustrating an exemplary API architecture in accordance with one embodiment of the invention.

FIG. 9 is a block diagram illustrating an exemplary API architecture in accordance with one embodiment of the invention. As shown in FIG. 9, the API architecture 900 can include API-implementing component 910 (e.g., an operating system, a library, a device driver, an API, an application program, or other module) that implements API 920. API 920 can specify one or more functions, methods, classes, objects, protocols, data structures, formats and/or other features of the API-implementing component that may be used by API-calling component 930. API 920 can specify at least one calling convention that specifies how a function in the API-implementing component receives parameters from the API-calling component and how the function returns a result to the API-calling component. API-calling component 930 (e.g., an operating system, a library, a device driver, an API, an application program, or other module), makes API calls through API 920 to access and use the features of API-implementing component 910 that are specified by API 920. API-implementing component 910 may return a value through the API 920 to API-calling component 930 in response to an API call.

Figure 10:
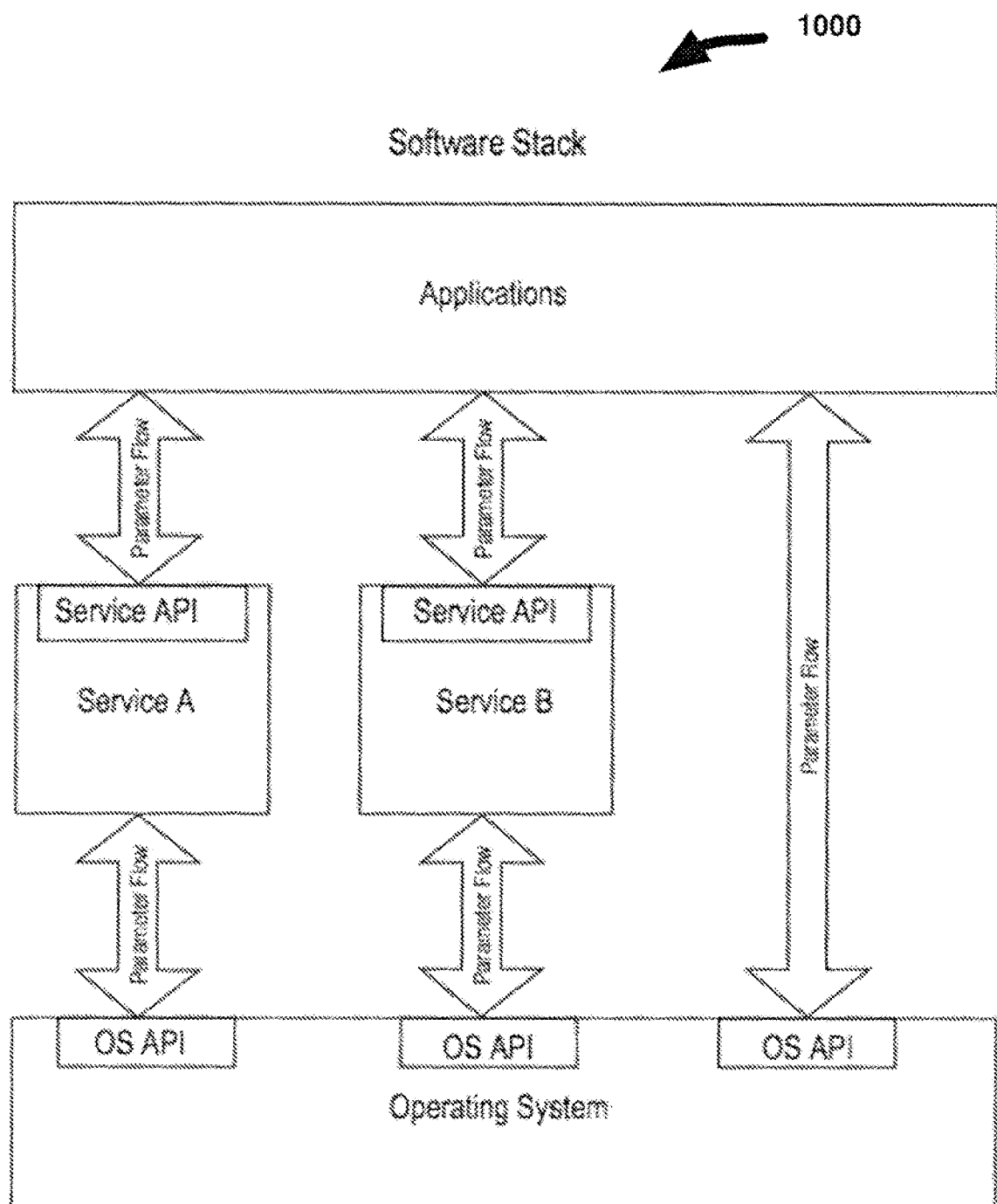
FIG. 10 is a schematic view of illustrative device applications using API calls in accordance with one embodiment of the invention.

It will be appreciated that API-implementing component 910 can include additional functions, methods, classes, data structures, and/or other features that are not specified through API 920 and are not available to the API-calling component 930. It should be understood that API-calling component 930 may be on the same system as API-implementing component 910 or may be located remotely and accesses API-implementing component 910 using API 920 over a network. While FIG. 9 illustrates a single API-calling component 930 interacting with API 920, it should be understood that other API-calling components, which may be written in different languages (or the same language) than API-calling component 930, may use API 920. In FIG. 10 ("Software Stack"), an exemplary embodiment, applications can make calls to Services A or B using Service API and to Operating System (OS) using OS API. Services A and B can make calls to OS using OS API.

Although many of the embodiments of the present invention are described herein with respect to personal computing devices, it should be understood that the present invention is not limited to personal computing applications, but is generally applicable to other applications.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, optical disks (e.g., CD-ROMs, DVDs, or Blu-Ray discs), magnetic discs, magnetic tape, and flash memory devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. An electronic device comprising:
    a housing; and
    control circuitry, audio circuitry, one or more speakers, and an audio output route all of which are integrated within said housing of the electronic device, the control circuitry operative to:
        identify a current mode of the device, wherein the current mode comprises one of a first mode, or a second mode;
        in response to identifying the current mode is the first mode, direct the audio circuitry to prevent received audio from being output to said one or more speakers of the electronic device through a first audio output route;
        in response to identifying the current mode is the second mode, direct the audio circuitry to provide the received audio for output to the one or more speakers of the electronic device through the first audio output route; and
        in response to sensing that an accessory is coupled to the device, i) switch routing of the received audio within the device from the second mode to the first mode, and ii) upon the accessory becoming coupled to the device, the audio circuitry provides the received audio for output to the accessory through a second audio output route, wherein the second audio output route couples the accessory to the electronic device with a Bluetooth audio route.

2. The electronic device of claim 1, wherein the second audio output route couples the accessory to the device with an audio route supporting A2DP or HFP protocols.

3. The electronic device of claim 1, wherein the electronic device includes an input interface having a button or a touchscreen.

4. The electronic device of claim 1, wherein the accessory is an output interface.

5. The electronic device of claim 4, wherein the output interface is a speaker.

6. The electronic device of claim 1, wherein the accessory is part of a dock that retains the electronic device.

7. The electronic device of claim 1, wherein volume control is provided using the accessory coupled to the device through the second audio output route.

8. The electronic device of claim 1, wherein the first mode is mute mode, the second mode is silent mode.

9. The electronic device of claim 1, wherein the electronic device is a telephone, a desktop computer, or a notebook computer.

10. A method performed by an electronic device, the method comprising the following operations performed by control circuitry which is integrated along with audio circuitry and a first audio output route within a housing of the electronic device:
    identifying a current mode of the device, wherein the current mode comprises one of a first mode, or a second mode;
    in response to identifying the current mode is the first mode, directing the audio circuitry to prevent received audio from being output to one or more speakers of the electronic device through the first audio output route;
    in response to identifying the current mode is the second mode, directing the audio circuitry to provide the received audio for output to the one or more speakers of the electronic device through the first audio output route; and
    in response to sensing that an accessory is coupled to the device, i) switching routing of the received audio within the device from the second mode to the first mode, and ii) upon the accessory becoming coupled to the electronic device, the audio circuitry provides the received audio for output to the accessory through a second audio output route, wherein the second audio output route couples the accessory to the electronic device with a Bluetooth audio route.

11. The method of claim 10, further comprising in response to sensing that the accessory is decoupled from the device, remaining in the first mode.

12. The method of claim 10, wherein the second audio output route couples the accessory to the device with an audio route supporting A2DP or HFP protocols.

13. The method of claim 10, wherein the electronic device includes an input interface having a button or a touchscreen.

14. The method of claim 10, wherein the accessory is an output interface.

15. The method of claim 14, wherein the output interface is a speaker or projector.

16. The method of claim 10, wherein the accessory is part of a dock that retains the electronic device.

17. The method of claim 10, wherein volume control is provided using the accessory coupled to the device through the second audio output route.

* * * * *